July 1, 1969  L. A. GURSKY ET AL  3,453,164
METHOD OF BUILDING FABRIC ELASTOMERIC CONTAINERS
Original Filed April 19, 1963
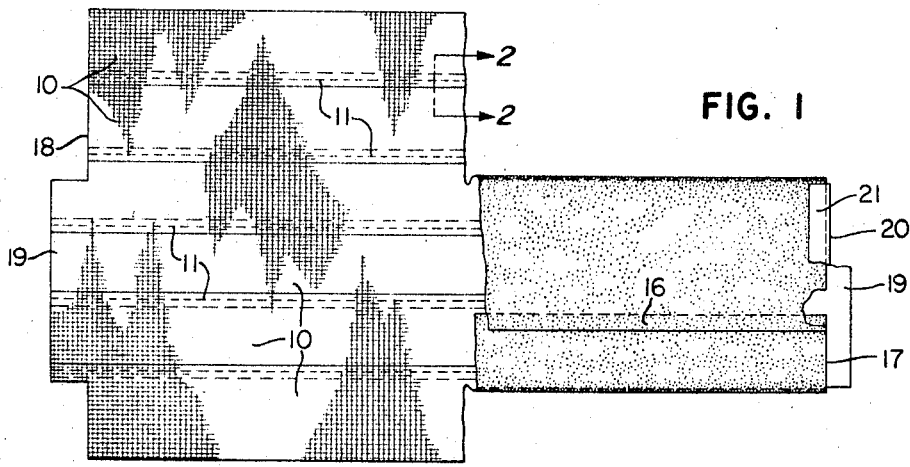
FIG. 1
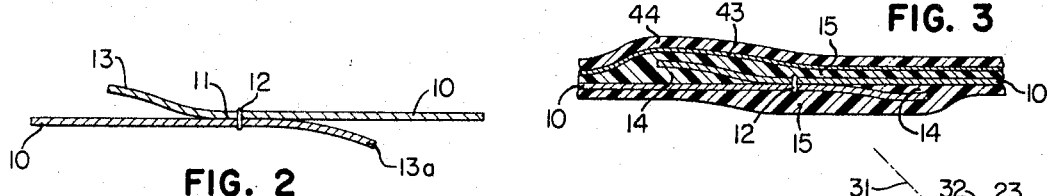
FIG. 2  FIG. 3
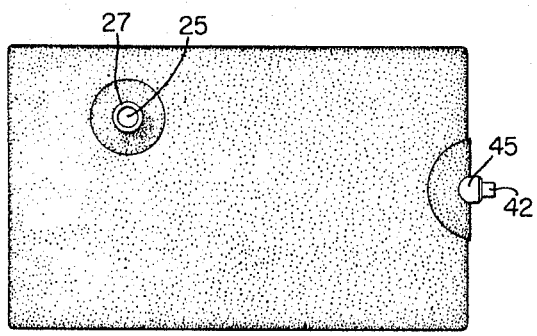
FIG. 5
FIG. 4
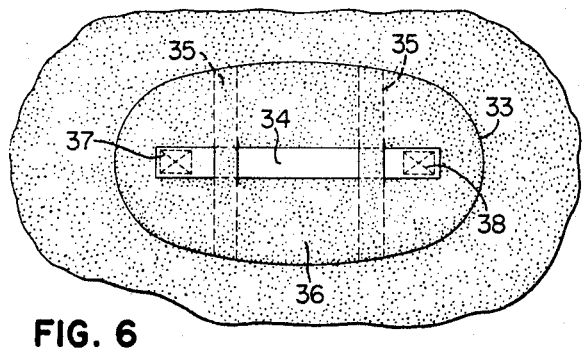
FIG. 6
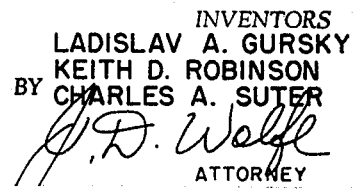
*INVENTORS*
LADISLAV A. GURSKY
KEITH D. ROBINSON
BY CHARLES A. SUTER
ATTORNEY United States Patent Office 3,453,164
Patented July 1, 1969

3,453,164
METHOD OF BUILDING FABRIC ELASTOMERIC CONTAINERS
Ladislav A. Gursky, Kent, Charles A. Suter, Cuyahoga Falls, and Keith D. Robinson, Mogadore, Ohio, assignors to The Goodyear Tire & Rubber Company, Akron, Ohio, a corporation of Ohio
Original application Apr. 19, 1963, Ser. No. 274,280. Divided and this application Jan. 24, 1967, Ser. No. 611,404
Int. Cl. B29c *17/02;* B05c *7/02*
U.S. Cl. 156—198     1 Claim

ABSTRACT OF THE DISCLOSURE

A container and methods of forming said container by forming a body portion with suitable fabric, coating the fabric with a liquid polyurethane reaction mixture and a barrier layer, if desired, turning the body portion inside out to expose the former inside surface, coating the surface with a liquid polyurethane reaction mixture, closing the body portion to complete the container and attaching fittings, the said body portion being displayed by external means to facilitate the coating of the outside surface. Alternately, the closed container is inflated and coated with the liquid polyurethane reaction mixture and a barrier layer, if desired, from inside the container.

---

This application is a division of Ser. No. 274,280 filed Apr. 19, 1963, now abandoned. Ser. No. 611,773 filed on Jan. 25, 1967 and now U.S. Patent No. 3,400,741 is a streamlined continuation of said Ser. No. 274,280.

This invention relates to a method of producing elastomeric fabric containers which are liquid tight to said containers. More specifically, it relates to a method of forming large fuel storage tanks.

Heretofore the building of large fabric rubber containers such as portable or temporary fuel storage tanks has required very expensive calenders to produce the rubberized fabrics, then the rubberized fabric had to be cut, shaped and cemented. Then the built rubberized fabric tank had to be placed in a large autoclave to be cured. Consequently the production cost per gallon of storage on liquid containers so produced was very high and these temporary storage vessels offered little cost advantage over permanent construction such as metal or wooden vessels.

The object of this invention is to provide a method of making elastomeric fabric containers more economically and to eliminate the need for calenders and the curing equipment normally used in conventional rubber fabric construction.

Additional objects and advantages will be evident from the following descriptions, claims and drawings wherein:

FIG. 1 is a plan view of the several pieces of fabric assembled and stitched together with only part of the last seam 16 forming the tube completed.

FIG. 2 is a cross sectional view along 2—2 of FIG. 1.

FIG. 3 is the same view as FIG. 2 except this view shows the finished container.

FIG. 4 is a plan view of another embodiment showing several pieces of fabric assembled and stitched together with only part of the seams forming the tube completed but with the end caps being formed as an integral part of the tube fabric.

FIG. 5 shows a body portion made of special knit fabric which is free of seams.

FIG. 6 is a partial view of the tank showing the handle assembly.

In accordance with one embodiment of the present invention, the fabric is cut into strips of the desired length and then assembled by overlapping the edges of the fabric which may be of the polyamide, polyester, polynitrile, polyurethane, metal or glass fiber, cellulose or modified cellulose type fabric and stitching to form individual seams. The several strips of fabric are then folded over and the last seam made to form a tube. This tube is spread flat upon a plane surface or alternately the tube can be suspended from a suitable support. Then at least one and preferably two coats of a liquid polyurethane reaction mixture is applied to the exposed surface of the tube. Then at least one and preferably two coats of a material suitable for forming a fuel vapor barrier is applied to the polyurethane coating prior to the time the polyurethane reaction mixture has cured. Then if desired at least one and preferably two or more coats of a liquid polyurethane reaction mixture may be applied over the vapor barrier such as a polyamide or a polyvinyl alcohol. It should be evident that since only that portion of the tube having its surface exposed can be coated, the tube should be turned over and spread flat to expose the surface heretofore hidden. The newly exposed surface according to the preferred practice then is given at least one coat of polyurethane followed by at least one coat and preferably two of a vapor barrier material and at least one and preferably two coats of polyurethane over the vapor barrier in the manner heretofore described.

With the outside surface of the tube coated with polyurethane and containing a vapor barrier, the tube is ready to be turned inside out which may be accomplished by holding one end and folding the other end back over the tube to turn the tube wrong side out. With the tube turned wrong side out, the vapor barrier will be on the inside of the finished container. Also this exposes the surface of the tube previously on the inside of the tube which has not been coated with polyurethane. Again the tube is spread flat on a plane surface or alternately is suspended from a support and at least one and preferably two or more coats of polyurethane is sprayed onto the exposed surface. It will be necessary to turn the tube over and spread it flat on the surface again to expose the hidden surface. The newly exposed surface is given at least one spray coat of a liquid polyurethane reaction mixture. Now the tube is ready to have the end members put into position and attached to form a liquid type container, although by the preferred practice the end members are attached before coating the outside of the tank with polyurethane.

The end members may be formed by folding a suitable piece of fabric having the necessary dimension into a U shape and cementing these U-shaped members on each end of the tube. It is a preferred practice that both the inside and outside of the U end members be coated with polyurethane to give at least two coats on the inside with at least one of the inside coats of polyurethane also having a vapor barrier material adhered thereto. The seam between the end member and the end of the tube is best formed by applying a coat of a liquid polyurethane reaction mixture or other suitable cement within the seam and then pressing the fabric down in the overlapped area and then curing the liquid reaction mixture to obtain proper adhesion within the seam area.

Although the access openings can be made and attached in any stage of manufacture of the container, the preferred practice is to cut the fabric and attach the fitting after the application of the first polyurethane coat. The preferred practice permits the fittings to be placed in position on the fabric and be built as an integral part of the tank to thereby obtain a container having additional resistance to fitting failures.

This invention may be better understood by referring to FIG. 1 wherein numeral 10 indicates several pieces of fabric laid out side by side to give a pattern as shown. These individual pieces of fabric 10 have been stitched together to form the seams 11 which are more clearly shown in FIG. 2. The numeral 12 indicates the sewed stitch. It should be noted that the respective edges of the fabric strips 13 and 13a permit the liquid polyurethane reaction mixture to be applied between and over the overlapped area and when the overlap area is pressed down and the polyurethane cured the finished seam has the appearance shown in FIG. 3 with the polyurethane 14 being shown between the seam overlaps and on top and bottom of the sewn area by the numeral 15. Also, numeral 43 indicates a polyamide vapor barrier and numeral 44 represents the top coat of polyurethane. Referring again to FIG. 1 it will be seen that when the last seam 16 is formed the fabric is formed into a tube having open ends 17 and 18 respectively.

FIG. 1 shows a preferred embodiment which reduces the number of seams to be formed and also reduces the labor of building the end member. In this embodiment some of the strips of fabric project beyond the tube ends 17 and 18 respectively as shown by numerals 19 to supply fabric for forming the end caps. After the tube has been formed and has had the inside surface of the tube and end caps coated with polyurethane and the vapor barrier, the end cap member 19, according to one building practice, is folded over in the manner shown by numeral 20 to form a U. The free end of the end member 19 is cemented to the tube end 17 in the overlapped area 21 to enclose the open end of the tube.

It has been found desirable to use a corner block 22 to form the seam in the corner areas 23. After the end cap member 19 has been cemented in the overlap area 21, it is preferred to trim the corner along the dotted line 31 to remove the triangular shaped fabric 32 shown in dotted outline. Then the corner block 22 is placed inside the tank in the position shown in FIG. 4. The corner block is preferably treated with a releasing material such as Johnson's Paste Wax and then the exposed wax surface of the block and the surrounding area of the fabric in the vicinity of the corner is coated with a polyurethane liquid reaction mixture. After a suitable thickness of polyurethane is obtained a spray coat of a suitable vapor barrier material may be applied over the polyurethane before the polyurethane has cured. Then additional coats of polyurethane may be applied over the vapor barrier layer. A knit fabric cut essentially to the size and configuration shown in FIG. 4 by numeral 41 is spread over the corner block and adhered to the liquid polyurethane reaction mixture prior to the time it has set, then the cloth is pulled tight around the outer curvature 26 of the corner block which has previously been coated with the necessary coats of the liquid polyurethane reaction mixture and vapor barrier. Thus, with the cloth cemented in place over the corner blocks the position of the corner block will be outlined by the line 24.

Once the corners have been prepared in this manner then the tank is ready to be coated on the outside with the necessary coats of a liquid polyurethane reaction mixture to give a rubberized tank. Also, it is preferred to have the access openings 25 and fittings 27 made and placed on the container prior to the time the corner blocks are put in place as this will permit the corner blocks to be removed through the access openings. Also, this technique permits the fabric stress ring 28 which is held to the metal nut ring 29 by the flange 30 to be formed integrally with the container when the outside surface of the container and the corners are spray coated with the liquid polyurethane reaction mixture.

The handle assembly 33, where needed, is attached to the tank by pressing the assembly 33 down on the fabric while the liquid polyurethane reaction mixture is still very fluid and maintaining pressure on the assembly until the reaction mixture has cured. Then the spray coat of liquid polyurethane reaction mixture is applied over the body portion and the assembly to form the handle as an integral part of the tank. It is preferred to put a piece of cardboard coated with wax or other releasing agent under the handle 34 in the area between the slip straps 35 to keep the handle from being stuck to the body 36 of the handle assembly. Normally the fabric handle 34 is sewn to the fabric of the body 36 near the ends 37 and 38.

Reference to FIG. 5 will show a container which is free of seams. The body portion of this container is formed by knitting or weaving a fabric into the required length and circumferential dimensions, then the access openings 25 and 45 are cut into the fabric and the necessary fittings 27 and 42 are placed on the opening. Then the outside of the fabric body portion is covered with at least one coat of a liquid polyurethane reaction mixture and reacted to form a set and cured polyurethane elastomer. Then a suitable air blower is placed in the access opening and used to inflate the container. With the containers inflated a workman can enter the inside of the container and spray coat the inside of the container with the liquid polyurethane reaction mixture and also apply the polyamide vapor barriers. It should go without saying that the workman inside the container should be equipped with a suitable gas mask or other breathing equipment. Since the liquid polyurethane reaction mixtures will normally set and cure at room temperature in a manner of a few minutes to several days depending on the nature of the polyurethane reaction mixture, there is no need to place the container in a curing oven although it may be found advantageous to subject the finished container to a temperature of about 100–250° F. for a period of one to several hours where maximum physical properties are desired in a hurry.

A suitable polyurethane coating composition comprises a liquid reaction mixture of (1) an organic polyisocyanate and (2) a reactive hydrogen containing polymeric material such as the polyesters, polyesteramides and polyethers dissolved in sufficient solvent to yield a sprayable mixture, and (3) sufficient crosslinking agent to react with the free polyisocyanate. Normally, the polyurethane coating composition should contain from about 40 to essentially 100% solids. Coating compositions containing less than 40% solids can be used, too. However, where the solid content of the coating composition is very low the individual coats will be thinner and the amount of the solvent to be disposed of or recovered will be larger than with a higher solid content coating composition. About 65% and even higher solid content coating compositions are desired so long as the solid content is not too high to prevent uniform coating of the fabric or a tendency to flow. Preferably the solid content should be about 70 to 90% or higher if the mixture is still applicable at this solid content. As indicated above the thickness of each spray coat is to a certain extent determined by the solid content of the spray. Also the solid content of the spray effects the solvent pollution problem in the spraying area, therefore it is desirable that the solid content of the spray composition be adjusted to give a spray coat of about 5 to about 20 mils in thickness. Where the coating thickness per spray pass exceeds about 5 to 10 mils the coating on vertical surfaces frequently exhibits a tendency to sag or flow instead of going on as a satin-smooth film.

Any of the reactive hydrogen containing polyesters, polyesteramides and polyethers suitable for making polyurethane castings useful as tire compositions may be used either as is or by suitable modifications to prepare the coating polyurethane compositions of this invention. In general the polyesters are preferred over the polyethers for the preparation of the polyurethane coating compositions. This preference is based primarily upon the fact the polyesters produce coatings of greater strength and solvent resistance than the polyethers but the polyethers are preferred in the exposed surface where hydrolysis and bactericidal resistance is needed.

Representative examples of the polyesters useful in this invention are the condensation products of a glycol with an organic dicarboxylic acid or anhydride having a molecular weight of about 700 to 5,000 and preferably from 1,000 to 3,000. Representative glycols are ethylene, propylene, tetramethylene, pentylene, decamethylene, etc. Representative examples of the organic dicarboxylic acids or anhydrides are succinic, glutaric, adipic, phthalic, terephthalic, isophthalic, suberic, sebacic, pimelic, and azelaic. Also, small amounts, i.e., 1 to 20% or more, or certain tri- or higher functional polyols and acids can be used to produce a small amount of branching in the polymeric material and thereby vary the stiffness of the fabric obtained by spray coating. This is desirable where a tank is desired that will not collapse when empty.

The prepolymers of this invention may be prepared from reactive hydrogen containing polymeric materials (hereinafter sometimes referred to in a more restricted sense as polymeric glycols or polyols) and an organic polyisocyanate by the procedures well known to the art. Any of a wide variety of polymeric glycols having a molecular weight of from 750 to 10,000 may be used. Of the polymers prepared from polyalkylene ether glycols, the polytetramethylene ether glycols are preferred. It is to be understood that other polyols such as polyalkylenearylene ether glycols or triols, polyalkylene ether-thioether glycols or triols and polyester glycols may be used.

In the preparation of the isocyanate-terminated polymers, a molar excess of a polymeric polyol such as a polyalkylene ether glycol or polyester glycol are first reacted with an organic diisocyanate to prepare a polyurethane glycol which may subsequently be reacted with a molar excess of an organic diisocyanate so as to prepare an isocyanate-terminated polymer. Alternatively, the polymeric glycol may be reacted directly with a molar excess of an organic diisocyanate. In the preparation of these polymers, overall molar ratios of organic diisocyanate to polymeric polyol of between 1.2:1 and 12:1 should be used at temperatures ranging from about 20° C. to about 150° C. Better results are obtained at ratios of about 1.5:1 to 2.5:1, as less time between spray coats is required.

Any of a wide variety of organic diisocyanates or mixtures thereof containing some higher functional isocyanate may be employed for the preparation of the isocyanate-terminated polymer, including aromatic, aliphatic and cycloaliphatic diisocyanates and combinations of these types. Representative compounds include toluene-2,4-diisocyanate; mixtures of toluene-2,4- and -2,6-diisocyanates; m-phenylene diisocyanate; 4-chloro-1,3-phenylene diisocyanate; 4,4'-biphenylene diisocyanate; 1,5-naphthylene diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis(cyclohexyl isocyanate) and 1,5-tetrahydronaphthylene diisocyanate. For purposes of the present invention, the toluene-diisocyanates; diphenylmethane-4,4'-diisocyanate and 3,3'-dimethyl-4,4'-bisphenylene diisocyanate are preferred, and these respective diisocyanates are sometimes hereinafter referred to for convenience as TDI, MDI and TODI.

These prepolymers are dissolved or dispersed in suitable solvents hereinafter described and then are mixed with a crosslinking agent which preferably is dissolved or dispersed in a suitable solvent. The amount of solvent used for preparing the dispersion of the prepolymer or mixtures of polymeric polyols and polyisocyanate and the crosslinking agent are determined primarily by the viscosity desired in the mixture and the nature of the spraying equipment in which the mixture is to be used. If high pressure spray equipment is used, the amount of solvent required may be less as higher viscosities can be tolerated.

Hence, the solid content of the reaction mixture may be very high and contain only a few percent solvent. Also, it should be appreciated that where the reaction mixture is essentially free of prepolymer, there is less need to use solvent and in some cases no solvent need be used. The crosslinking agent may be a material containing three or more reactive groups, e.g. glycerol or triethanolamine, but bifunctional materials are preferred. In general, the bifunctional materials yield products having superior spraying properties. Representative classes of compounds suitable for use as crosslinking agents are the glycols, the diamines having primary or secondary amino groups, the dicarboxylic acids, the hydroxy amines, the hydroxy-carboxylic acids and the amino-carboxylic acids. Representative examples of suitable compounds belonging to these classes are ethylene glycol; 1,3-propane-diol; 1,4-butane-diol; ethylene diamine; trimethylene diamine; tetramethylene diamine; m-phenylene diamine; o- and m-dichlorobenzidine; 2,5-dichloro-phenylene diamine; 3,3'-dichloro-4,4'-diamine-diphenyl methane; dianisidine; 4,4'-diamino-diphenyl-methane (hereinafter sometimes referred to as MDA); naphthylene diamines; tolylene-2,4-diamine; p-aminobenzyl aniline; o- or p-amino-diphenyl-amine; a-aminoethyl alcohol; 2-amino-1-naphthol; m-aminophenol; 2-methyl-2-amino propanol. The preferred glycol crosslinker is butane diol.

The fast amino crosslinkers such as MDA are preferred in making pillow tanks and related sprayed liquid containers as the fast amine crosslinkers permit the sprayed fabric container to be turned or moved with a shorter cure time. Hence, the time between successive spray coats is shorter and thereby permits more efficient utilization of the spray equipment and floor space.

By the term "fast amine crosslinkers" is meant those diamines which develop a turbidity inside of about 10 to 30 seconds with the boiling methylene chloride test. By this method essentially a saturated solution of the diisocyanate and diamine are each made up in methylene chloride. This usually gives about .2 to .5 molar solution of the diisocyanate and the diamine when dissolved in methylene chloride. The boiling methylene chloride solutions of the diamine are mixed and then time required to develop a turbidity is measured. Those diamines which develop turbidity after 30 seconds are considered to be slow diamines. Where the slow diamines are used, the time required for the spray coat to become tackfree is appreciably longer than that required for the fast diamines. Therefore, it is necessary to allow more time before the next spray coat is applied, when using slow diamines such as methylene dichloroaniline (MOCA) or dichlorobenzidine (ODCB). Some combinations using the slow curing diamines are as follows:

TDI—MOCA
TDI—ODCB
TDI—APS [1]
TODI—MOCA
TODI—ODCB
TODI—APS
MDI—MOCA
MDI—ODCB
Naphthalene diisocyanate—MOCA
Naphthalene diisocyanate—ODCB
Naphthalene diisocyanate—APS
4,4'-diphenyl diisocyanate—MOCA
4,4'-diphenyl diisocyanate—ODCB
4,4'-diphenyl diisocyanate—APS Combinations of isocyanate and fast curing diamines especially well suited for use in this invention are:

TDI—MDA
MDI—MDA
TODI—MDA

Any of the non-reactive solvents normally used in

---

[1] APS is bis(3,3'-amino phenyl) sulfone, a fast amine.

making paints which are suitable for spraying may be used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, cellosolve acetate, cellosolve propylate, cellosolve acetate butyrate, dioxane, lower boiling nitro alkanes, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment on a hundred parts of prepolymer basis to improve the weather and reflective characteristics.

Submicroscopic pyrogenic silica such as prepared in a hot gaseous environment by the vapor phase hydrolysis of silicon tetrachloride and available from Godfrey L. Cabot, Inc. under the trademark Cab-O-Sil is especially useful as a leveling agent in the sprayable polyurethane compositions when used in about 0.1 to 15 parts per 100 parts of solids in the solution. The preferred amount is about 0.5 to 6 parts as the amount of solvent needed to give a sprayable viscosity is not materially changed. Also, this range of pyrogenic silica gives good thixotropic properties to the resulting sprayable composition.

In order to further describe the invention several embodiments thereof are set forth with respect thereto. However, it should be understood that such embodiments are set forth for illustrative and not limitative purposes. All parts are by weight unless otherwise designated.

EXAMPLE I

A pillow tank 12 feet in diameter by 42 feet was made by forming a tube of a nylon fabric and coating the inside and outside with a polyurethane liquid reaction mixture with a coating of nylon vapor barrier material applied inside the tube. The nylon vapor barrier is applied preferably by spraying as an N-propanol solution of the polyamide.

The liquid polyurethane reaction mixture used in this example was prepared from a prepolymer. This prepolymer was prepared by reacting 6 moles of toluene diisocyanate with 2 moles of a polyester prepared by the condensation of adipic acid with an execess of a mixture consisting of 80% ethylene glycol and 20% propylene glycol and 1 mole of a polyester prepared by the condensation of adipic acid with an excess of butane diol.

This prepolymer was used to prepare a black masterbatch by mixing 240 parts of this prepolymer with 142 parts of carbon black, 86 parts of cellosolve acetate and 377 parts of methyl ethyl ketone.

A cement was made by mixing a mixture of 51 parts of a 10% solution of cellulose acetate butyrate in methyl ethyl ketone, 39 parts of submicroscopic silica (Cab-O-Sil) with a well dispersed mixture of 389 parts of cellosolve acetate, 220 parts of methyl ethyl ketone and 82 parts of the above mentioned black masterbatch.

Component 1 of the spray mixture was formed by mixing 349 parts of the above cement with 548 parts of the above mentioned prepolymer.

Component 2 of the spray mixture was made by mixing 199 parts of MDA with 538 parts of methyl ethyl ketone.

Components 1 and 2 were mechanically metered in the proportions to give about 0.7 to 0.9 mole of MDA for each mole of excess toluene diisocyanate over that equivalent to the polyester and were mixed continuously and then were sprayed. The continuous metering, mixing and spraying equipment is preferred with MDA and the other fast crosslinkers since the mixture of components 1 and 2 remains sprayable for less than 10 minutes, normally.

EXAMPLE II

A cement was made consisting of 145 parts of a 60% colored pigment dispersed (Marine Green) in dibutyl phthalate by paint 3 roll milling; 324 parts of cellosolve acetate; 271 parts of methyl ethyl ketone; 58 parts of a solution of 10% of cellulose acetate butyrate in methyl ethyl ketone, 20 parts of Modaflow, a polymeric surface-active agent supplied by Monsanto Chemical Company, and 60 parts of Cab-O-Sil.

Component 1 of the spray mixture was formed by mixing 387 parts of the above mentioned cement with 530 parts of the prepolymer of Example I.

Component 2 of the spray mixture contained 199 parts of MDA and 538 parts of methyl ethyl ketone.

Components 1 and 2 were mechanically metered in the proper proportions into a continuous mixer and then sprayed immediately on to the surfaces of the pillow tank.

EXAMPLE III

Another two-component spray recipe satisfactory for use in accordance with the procedure of Example I is given below:

Black.—Component #1

| | Parts |
|---|---|
| Prepolymer | 558 |
| Cellosolve acetate | 177 |
| Methyl ethyl ketone | 135 |
| Lampback | 6 |
| Cellulose acetate butyrate | 2 |
| Cab-O-Sil | 18 |

Colored (green).—Component #1

| | |
|---|---|
| Prepolymer | 530 |
| Cellosolve acetate | 130 |
| Methyl ethyl ketone | 129 |
| Colored pigment | 35 |
| Dibutyl phthalate | 23 |
| Cellulose acetate butyrate | 2 |
| Modaflow | 8 |
| Cab-O-Sil | 27 |

Component #2

| | |
|---|---|
| Diamine | 199 |
| Methyl ethyl ketone | 538 |

The following prepolymers were used in the formulation of Component #1 of the black cements of Example I:

Prepolymer A

A reaction product of 2 mols of tolylene diisocyanate with about 1 mol of a polyester formed by condensing an excess of ethylene glycol with adipic acid.

Prepolymer B

Same as Prepolymer A except the mol ratio used was 1.1 to 1.

Prepolymer C

Same as Prepolymer A except propylene glycol was used to produce the polyester.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a poly tetramethylene ether glycol having a molecular weight of about 3000. This prepolymer was preferred for the exposed polyurethane coating as it had greater resistance to degradation.

In making rubber tanks in accordance with this invention it has been found to be a preferred practice to apply the polyurethane coatings to the fabric utilizing a polyester to prepare the liquid reaction mixture, then apply the final or outside coat of polyurethane using a liquid reaction mixture prepared from Prepolymer F. A tank prepared in this manner wherein the exposed inside and outside surface of the tank is coated with a polyether urethane exhibits superior resistance to bactericidal and fungicidal action and other contaminating or deleterious influences present in the soil and in the fuels being stored.

The amount of crosslinker used should be at least 0.1 mole per mole of reactive hydrogen containing polymeric material and normally is about 0.4 to no more than about 1 mole for each mole of polyisocyanate in excess of that equivalent to the reactive hydrogen containing polymeric material. It is preferred to use about 0.6 to .95 mole of diamine for each mole of polyisocyanate in excess of that equivalent to the polyester or polyether polyol.

While certain representative embodiments and details have been shown for the purpose of illustrating the invention, it will be apparent to those skilled in the art that various changes and modifications may be made therein without departing from the spirit or scope of the invention.

What is claimed is:

1. A method of forming a container having an excess opening comprising the successive steps of:
    (1) coating the outer surface of a fabric with a liquid polyurethane reaction mixture, said liquid polyurethane reaction mixture comprising
        (a) a reactive hydrogen containing polymeric material of about 700–6000 molecular weight selected from the class consisting of the hydroxyl terminated polyesters, the polyether polyols and the polyester amides,
        (b) an organic polyisocyanate, and
        (c) a crosslinking agent selected from the class consisting of a diamine, a glycol and an aminoalcohol,
    (2) treating the coated fabric containing the liquid polyurethane reaction mixture to cause it to set and seal the pores between the interstices of the fabric,
    (3) forming the fabric into a tube of the desired length,
    (4) closing the ends of the tube with an end member of fabric which contains a coating of polyurethane on the outside surface, and
    (5) inflating the enclosure with a gas and spray coating the inside of the enclosure while inflated with a polyurethane and causing the polyurethane to set and cure to give a container.

References Cited

UNITED STATES PATENTS

| | | | |
|---|---|---|---|
| 2,661,306 | 12/1953 | Duarry-Serra | 117—163 XR |
| 2,721,811 | 10/1955 | Dacey et al. | 117—11 |
| 3,046,172 | 7/1962 | Reid | 161—160 |
| 3,085,027 | 4/1963 | Porteous | 117—68 |

EARL M. BERGERT, *Primary Examiner.*

H. F. EPSTEIN, *Assistant Examiner.*

U.S. Cl. X.R.

117—68, 96; 156—217